United States Patent
Lewis et al.

(10) Patent No.: US 8,179,922 B2
(45) Date of Patent: May 15, 2012

(54) METHOD AND SYSTEM FOR MONITORING THE HEALTH OF WIRELESS TELECOMMUNICATION NETWORKS

(75) Inventors: Allan D. Lewis, New Dundee (CA); Mihal Lazaridis, Waterloo (CA); Gerald Winton Lankford, Holly Springs, NC (US); Herbert A. Little, Waterloo (CA); Hugh Hind, Waterloo (CA); Ian M. Patterson, Petersburg (CA)

(73) Assignee: Research In Motion Limited, Waterloo (CA)

( * ) Notice: Subject to any disclaimer, the term of this patent is extended or adjusted under 35 U.S.C. 154(b) by 74 days.

(21) Appl. No.: 12/574,564

(22) Filed: Oct. 6, 2009

(65) Prior Publication Data

US 2010/0020697 A1    Jan. 28, 2010

Related U.S. Application Data

(63) Continuation of application No. 10/995,062, filed on Nov. 22, 2004, now Pat. No. 7,616,665.

(60) Provisional application No. 60/561,582, filed on Apr. 13, 2004.

(51) Int. Cl.
*H04J 1/00* (2006.01)
(52) U.S. Cl. .................. 370/485; 370/352; 370/252
(58) Field of Classification Search .............. 370/401, 370/328, 485, 252, 352
See application file for complete search history.

(56) References Cited

U.S. PATENT DOCUMENTS

| | | | |
|---|---|---|---|
| 5,477,531 A | 12/1995 | McKee et al. | |
| 6,035,198 A * | 3/2000 | Wiehe | 455/445 |
| 6,104,929 A | 8/2000 | Josse et al. | |
| 6,259,923 B1 | 7/2001 | Lim et al. | |
| 6,446,123 B1 | 9/2002 | Ballantine et al. | |
| 6,658,260 B2 | 12/2003 | Knotts | |
| 6,963,748 B2 | 11/2005 | Chithambaram et al. | |
| 7,031,276 B2 | 4/2006 | Inoue | |
| 7,058,413 B2 | 6/2006 | Lin et al. | |
| 7,231,218 B2 | 6/2007 | Diacakis et al. | |
| 7,242,948 B2 * | 7/2007 | Fleischer et al. | 455/456.3 |
| 7,286,647 B2 * | 10/2007 | Stormon et al. | 379/32.01 |
| 7,327,258 B2 * | 2/2008 | Fast et al. | 340/572.1 |
| 7,333,794 B2 * | 2/2008 | Zappala | 455/404.1 |
| 7,489,938 B2 | 2/2009 | Flynn et al. | |
| 7,519,052 B2 | 4/2009 | Aoki et al. | |
| 7,555,542 B1 * | 6/2009 | Ayers et al. | 709/223 |

(Continued)

FOREIGN PATENT DOCUMENTS

WO    00/28755 A1    5/2000

(Continued)

*Primary Examiner* — Ricky Ngo
*Assistant Examiner* — Dewanda Samuel

(57) ABSTRACT

A method and system for monitoring the health of a wireless telecommunication network. Network health is monitored without placing an administrative burden on the carrier network itself, instead, this burden is placed on components that lie outside the carrier network and pass communications through it. The data service provider infrastructure sends a request to a mobile device, asking that it return data regarding its location. The carrier networks handling the request insert location information into the packet that is sent to the mobile device, but this information is not sent to the data service provider infrastructure itself. The mobile device harvests this location information from the packets it receives and inserts it in a response packet that finds its way back to the data service provider infrastructure. The data service provider infrastructure is able to collate this location data and to analyze it, determining the carrier network's health.

19 Claims, 5 Drawing Sheets

U.S. PATENT DOCUMENTS

| | | | |
|---|---|---|---|
| 7,571,058 B2 * | 8/2009 | Sealing et al. | 702/34 |
| 7,623,874 B2 * | 11/2009 | Duan | 455/456.1 |
| 2001/0014911 A1 | 8/2001 | Doi et al. | |
| 2002/0151313 A1 * | 10/2002 | Stead | 455/456 |
| 2003/0058818 A1 | 3/2003 | Wilkes et al. | |
| 2003/0081567 A1 | 5/2003 | Okanoue et al. | |
| 2004/0196858 A1 | 10/2004 | Tsai et al. | |
| 2004/0198386 A1 * | 10/2004 | Dupray | 455/456.1 |
| 2004/0203775 A1 | 10/2004 | Bourdeaut et al. | |
| 2008/0049630 A1 * | 2/2008 | Kozisek et al. | 370/250 |

FOREIGN PATENT DOCUMENTS

| | | |
|---|---|---|
| WO | 03/051076 A1 | 6/2003 |

\* cited by examiner

METHOD AND SYSTEM FOR MONITORING THE HEALTH OF WIRELESS TELECOMMUNICATION NETWORKS

CROSS-REFERENCE TO RELATED APPLICATIONS

This application is a Continuation of U.S. application Ser. No. 10/995,062 filed Nov. 22, 2004, which claims priority from and is related to provisional patent application No. 60/561,582, filed on 13 Apr. 2004, the contents of which are incorporated herein by reference.

This invention relates to communication networks, and more specifically, to a method and system for monitoring the health of wireless telecommunication networks.

BACKGROUND OF THE INVENTION

Over the last decade, digital communication networks employing personal computers (PCs), the Internet and other components, have increased levels of communication and access to information by an incredible degree. In the beginning, most of these networks were effected using hard-wired technology, but today, wireless digital services over GPRS (general packet radio service), CDMA (code division multiple access), Mobitex, DataTAC and similar systems are expanding the digital communications and data access revolution in a mobile environment. Wireless email, digital paging and Internet browsing via portable devices, for example, are now widely used.

Users of wireless telecommunication systems demand the very high levels of reliability that they have became accustomed to from hard-wired telephone networks (often referred to as "five-9s" reliability—less than one failure in 99,999 calls). However, administering a reliable wireless data service is much more difficult than hard-wired communications, not only because wireless transmissions are more prone to noise and interference, but also because many of the communications travel over a number of disparate communication networks between the service provider and the end user, often including packet-switched networks such as the Internet, circuit-switched networks and wireless telecommunication networks. While communications can move smoothly from one network to another, the protocols necessary for more complex operability such as monitoring network health are not standardized across such diverse networks.

The monitoring and analysis of network health information is critical to implementing reliable wireless data networks. As will be explained, existing systems do not facilitate effective network health monitoring and analysis.

An exemplary wireless data service network is presented in the simple block diagram of FIG. 1. In this example, a mobile node 10 is currently being served by a carrier network 12A, which will include at least one, and probably multiple wireless base stations which are organized into "cells"; each cell covering a certain geographical area. The carrier network 12A may use both hard-wired and wireless communications to connect these base stations and other infrastructure components together. This carrier network 12A may even use frame relay networks, optical networks, the public switched telephone network (PSTN) and the Internet as part of its network.

The carrier network 12A generally serves as a conduit between the mobile node 10 and the wireless data service provider infrastructure 14, simply passing digital packets back and forth between these two parties, without considering the content of the packets themselves.

Because the mobile node 10 is mobile, it may pass from the region served by one carrier network 12A, to another, such as carrier network 12B or carrier network 12C. Methods are known in the art for "handing off" communications from one base station to another within a given carrier's region, or even handing communication off from one carrier to another. However, handoff situations make the health monitoring task far more complex as there is no standard for the collection and communication of performance data. The network of FIG. 1 is intended simply to present a context for the problems in the art to be described. The details of a complete implementation of the network would be clear to a skilled technician.

In addition to offering reliable systems, the stakeholders of these wireless data networks want to optimize the use of their resources, offer cost effective services to their customers, and obtain some insight into where future infrastructure investments can best be made. This can only be done if they have a detailed understanding of the traffic flow and the performance of their network and network components.

Unfortunately, carrier networks are not designed to perform the collection, collation and analysis of real time data that would be necessary to do this network health analysis. Even if special hardware and software were added to the carrier networks 12A, 12B, 12C to perform the data analysis (in the form of servers, for example), the core network nodes do not have the functionality to perform the collection and collation tasks, for at least the following reasons:

1. Many of the nodes in these networks are designed to simply route digital packets, so major software (and possibly hardware) changes would be needed to provide the collection functionality;

2. Many of these nodes are optimized to perform their tasks as quickly as possible, so that real time operation can be maintained. Providing the extra functionality of analyzing network health may slow down their operation to an unacceptable level;

3. In some carrier networks, changing the functionality of the network nodes would require updating, testing and trouble shooting to be performed on each node individually—an expensive and time consuming exercise; and 4. While some nodes in one carrier's network may be adaptable to performing such functionality, it is unlikely that the whole network will. If the carrier uses a variety of networks and components including wireless, hard-wired, fiber optic, PSTN, Internet, frame relay and packet switched technologies, it may be impossible to obtain the necessary data uniformly throughout the entire network to obtain meaningful and useful data.

In other words, carrier networks are not in a position to obtain the network health data that they desire.

There is therefore a need for an effective method and system of collecting network health information in wireless telecommunication networks which avoids or addresses the problems outlined above.

SUMMARY OF THE INVENTION

It is an object of the invention to provide a method and system which obviates or mitigates at least one of the disadvantages described above.

In accordance with an aspect of the present invention, a system is provided for monitoring the health of a wireless telecommunication network, comprising: a mobile device; a data service provider infrastructure; and a carrier network having a wireless connection to said mobile device and a connection to said data service provider infrastructure; said data service provider infrastructure being operable to: generate a digital packet including a request for location information; and transmit said request packet to said mobile device via said carrier network; said carrier network being operable to: receive said request packet from said data service provider infrastructure; attach location information for said mobile device, to said request packet; and transmit said request packet including said location information, to said mobile device; and said mobile device being operable to: receive said request packet; extract said location information from said request packet; insert said location information into a field of an acknowledgement packet that said carrier network will pass to said data service provider infrastructure; and return said acknowledgement packet to said data service provider infrastructure, via said carrier network; said carrier network also being operable to: receive said acknowledgement packet from said mobile device; and pass said acknowledgement packet to said data service provider infrastructure; whereby said data service provider infrastructure may use said location information to analysis the health of said telecommunication network.

In accordance with another aspect of the invention, a method of monitoring the health of a wireless telecommunication network is provided, said telecommunication network including at least one mobile device, a data service provider infrastructure and a carrier network facilitating communication between said mobile device and said data service provider infrastructure, said method comprising the steps of: at said data service provider infrastructure: generating a digital packet including a request for location information; and transmitting said request packet to said mobile device via said carrier network; at said carrier network: receiving said request packet from said data service provider infrastructure; attaching location information for said mobile device, to said request packet; and transmitting said request packet including said location information, to said mobile device; and at said mobile device: receiving said request packet; extracting said location information from said request packet; inserting said location information into a field of an acknowledgement packet that said carrier network will pass to said data service provider infrastructure; and returning said acknowledgement packet to said data service provider infrastructure, via said carrier network; whereby said data service provider infrastructure may use said location information to analysis the health of said telecommunication network.

In accordance with a further aspect of the present invention, a server is provided comprising: means for generating a packet requesting location information; means for transmitting the request packet to a mobile device via a carrier network; means for receiving an acknowledgement packet from the mobile device; and means for extracting location information inserted into the acknowledgement packet by the mobile device.

In accordance with an additional aspect of the invention, there is provided a mobile device comprising: means for receiving a request packet, initiated by a data service provider infrastructure; means for extracting location information from the request packet, the location information having been added to the request packet by a carrier network; means for inserting the location information into a field of an acknowledgement packet that the carrier network will pass to the data service provider infrastructure; and means for returning the acknowledgement packet to the data service provider infrastructure, via the carrier network.

Other aspects and features of the present invention will be readily apparent to those skilled in the art from the following detailed description of preferred embodiments in conjunction with the accompanying drawings.

BRIEF DESCRIPTION OF THE DRAWINGS

These and other features of the invention will become more apparent from the following description in which reference is made to the appended drawings in which.

DESCRIPTION OF THE INVENTION

The invention allows network health to be monitored without placing an administrative burden on the carrier network itself. This is done by placing this burden on components that lie outside the carrier network, passing communications through it. The invention is suited for many network architectures and can be, for example, applied to that of FIG. 1.

Figure 2:
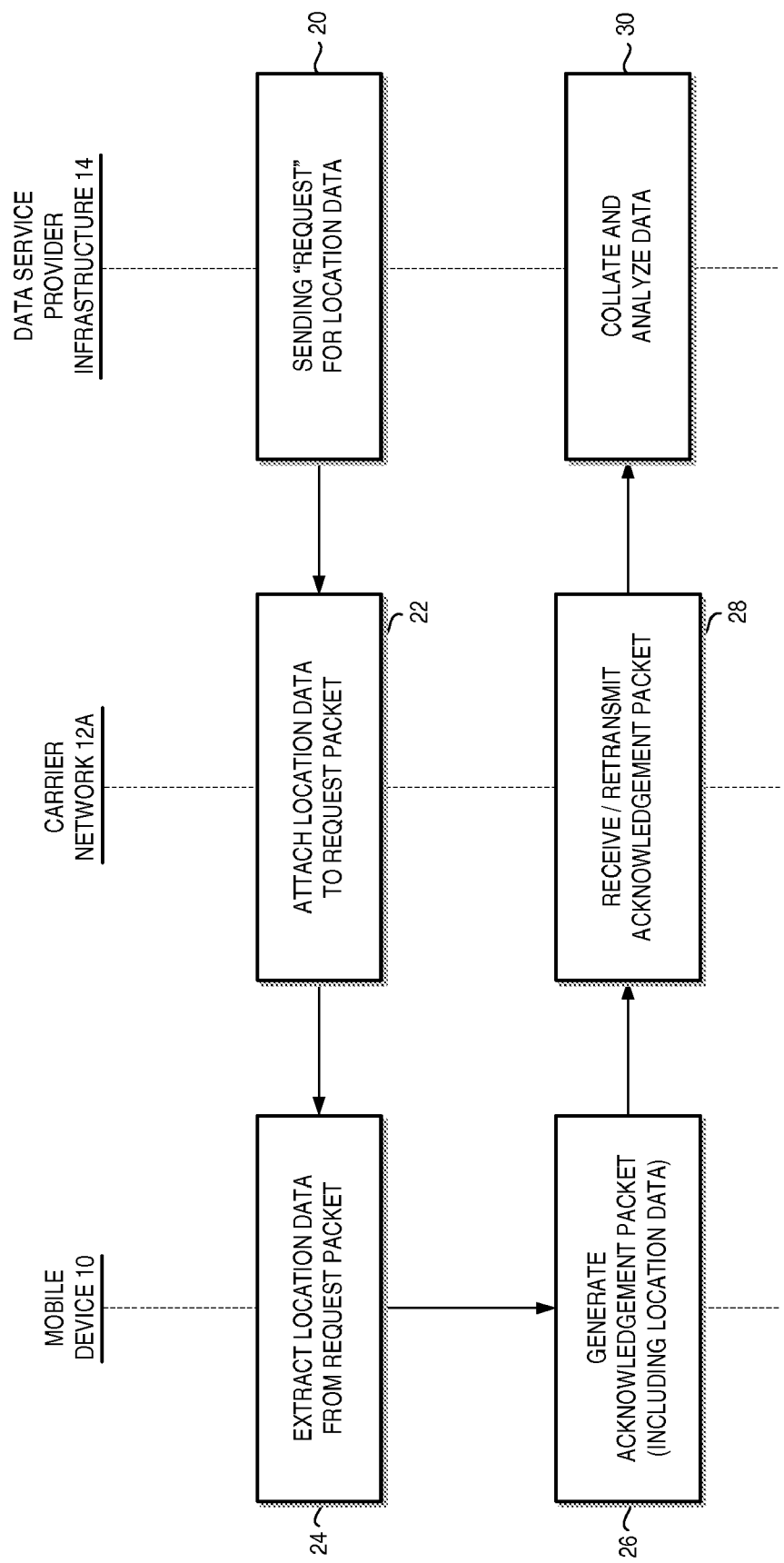
FIG. 2 presents a flow diagram of a method of monitoring network health, in an embodiment of the invention.

Broadly speaking, the method of the invention is effected as shown in the flow diagram of FIG. 2. This process begins at step 20, by having the data service provider infrastructure 14 send a request to the mobile device 10 of the end user, via one of the carrier networks 12A, 12B, 12C asking that it return data regarding its location. The carrier networks 12A, 12B, 12C cannot distinguish these instructions from any other digital packet transmitted by the data service provider infrastructure 14, so they simply pass the request packet to the mobile device 10 at step 22 (techniques for performing basic communications are known in the art and will not be described herein).

However, in passing the request packet, the carrier networks 12A, 12B, 12C will add location data to the packet. This is a standard procedure in wireless communications as the location data is generally inserted into the header of each packet at step 22, for identification and book-keeping purposes.

The mobile device 10 receives the request packet and extracts the data regarding its location at step 24. The location data is entered into a field of an acknowledgement packet at step 26 and is sent to the carrier network 12A, 12B, 12C. The carrier network 12A, 12B, 12C will simply pass any packets that it receives, back to the data service provider infrastructure 14 at step 28.

Receiving location data from all mobile devices, the data service provider infrastructure 14 is able to collate the data and analyze it at step 30 to obtain an overall picture of the telecommunication system's health including the operability of the various carrier networks 12A, 12B, 12C.

The nature of the location data is described in greater detail hereinafter with respect to the preferred embodiment of the invention, but could include, for example, the identity of the carrier network's base station serving the mobile device 10. This data alone would provide a great deal of information as it would locate each end user's position within several kilometers. The routing of the communication through the resources of the carrier's network 12A, 12B, 12C could then be determined.

This location data could, for example, be used to calculate peak demand levels per base station, the variance of traffic levels with respect to the hour of the day, or average levels of traffic by geographic area. Other analyses known in the art of telecommunication resources and traffic management could also be performed, some of which are described hereinafter.

As noted above, the digital data may be communicated using many systems known in the art, including: GPRS, CDMA, Mobitex and DataTAC systems. As time passes, surely other wireless data protocols and technologies will also evolve; the invention is equally applicable to such protocols and technologies as it operates independently of features of the carrier's network. Also, the mobile devices used by the end user could be one of many known in the art, including digital cellular telephones, personal digital assistants (PDAs), wireless laptop computers, wearable computers or two-way pagers. The invention is not limited by the nature of the mobile device to which it is applied.

The invention is also not limited by the nature of the digital packets being employed. That is, while FIG. 2 suggests that specific pairings of location "request" packets and "acknowledgment" packets will be employed, requests for location data and the location data itself will generally be combined with other packets. In the preferred embodiment described hereinafter, for example, requests for location data are made simply by setting a single bit in a generic digital packet. Similarly, location data is returned by piggy-backing it on another packet that would be sent as part of the existing protocol. Hence, any control or data packet could be used to carry location requests or location data.

The data service provider's system may be quite complex, including, for example, a number of nodes or servers, geographically distributed and interconnected via some communication network such as the Internet. At the other extreme, the data service provider infrastructure 14 may comprise just a single server—in such a case, the functionality of the server could be implemented, for example, in the hardware format shown in FIG. 3.

Figure 3:
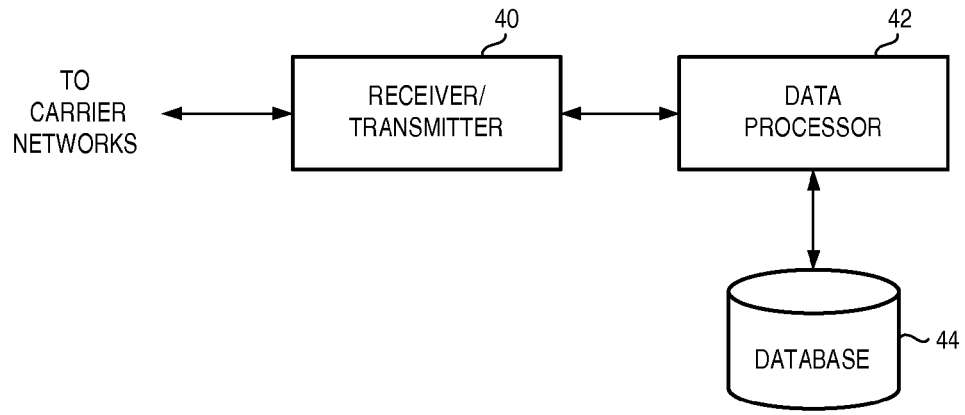
FIG. 3 presents a block diagram of an exemplary server architecture in an embodiment of the invention.

As shown in the block diagram of FIG. 3, the data service provide infrastructure 14 may be embodied as a server consisting of three main components: a receiver/transmitter 40 that receives and transmits data and/or control packets to and from various carrier networks, in the manner known in the art; a data processor 42 that is operable to perform a large number of tasks, including the following: generating packets or modifying packets to ask the mobile device to forward location data (the "request packets"); extracting location data from received packets; and collating and/or analyzing the collected location data (note that this task could also be deferred to another device); and a database 44 for storing location data as it is received. Note that this component could be internal to the server, or external. The storage technology used could take on any form, limited only by the access speed and storage capacity that is required for a particular application.

Figure 4:
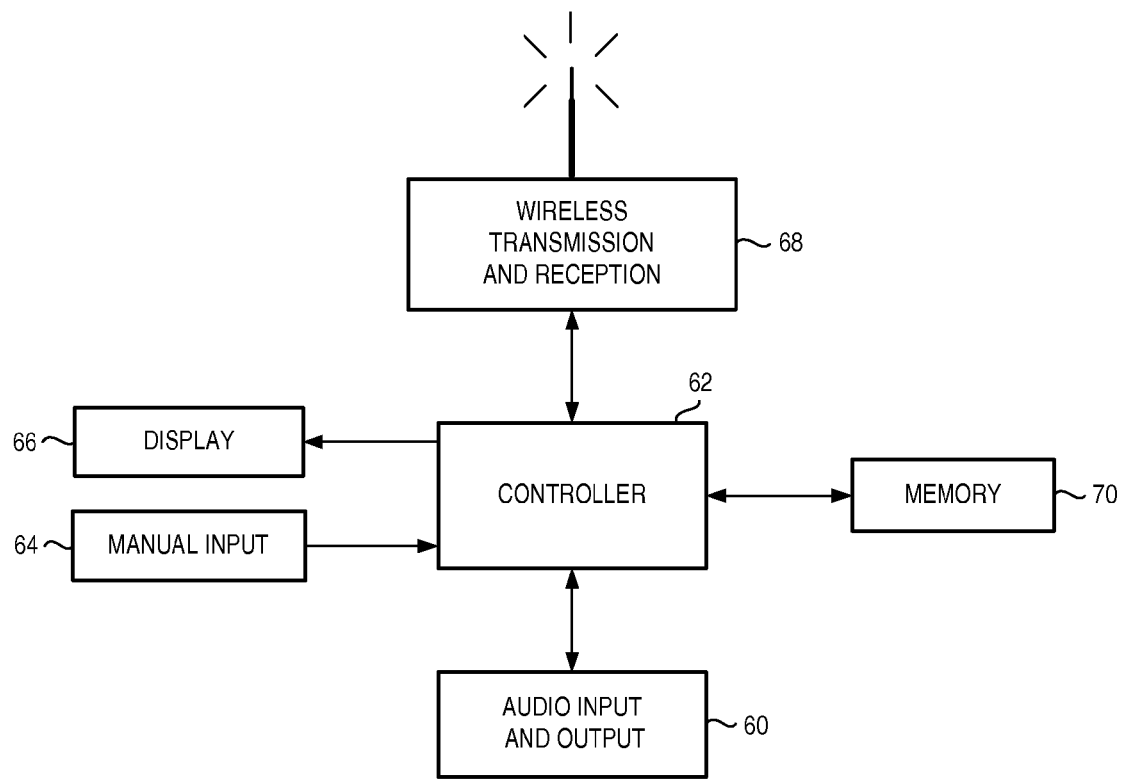
FIG. 4 presents a block diagram of an exemplary mobile device, in an embodiment of the invention.

As noted above, the mobile device 10 of the invention takes on any of many forms, including cellular telephones, personal digital assistants (PDAs), wireless laptop computers, wearable computers or two-way pagers. A generic mobile device 10 is presented in the block diagram of FIG. 4.

At the heart of this device lies a central controller 62 which may, for example, be a digital signal processor (DSP), microprocessor, microcontroller or ASIC (application specific integrated circuit). This controller 62 performs the basic functionality of the invention for the mobile device 10.

The interface components of the mobile device 10 will vary with the application. For example, in cellular telephone applications, an audio input and output 60 may be included, as well as signal processing components such as analogue to digital and digital to analogue converters, to pass voice signals to and from the central controller 62. As well, a cellular telephone may include a manual input interface 64 in the form of a mechanical keypad, and a display 66 consisting of a simple liquid crystal display (LCD) with a single line of alphanumeric characters to present dialed numbers and other information.

A wireless PDA, on the other hand may not have an audio interface 60, but may have much more comprehensive manual and visual interfaces. The display 66, for example, could comprise an LCD pixel matrix which could display graphics as well as alphanumerics. Rather than a traditional telephone keypad, the manual input interface 64 could comprise a mouse and pushbutton which drives a cursor on the display 66, allowing the user to select icons in a graphic user interface (GUI) to execute desired functions.

All of these mobile devices 10 will also include some manner of wireless transmission and reception components 68, as known in the art.

The controller 62 will also generally have access to off-processor memory 70, though it is possible that all necessary memory could be included on chip with the controller 62. Such memory could be a non-volatile memory such as an electrically erasable programmable read only memory (EEPROM) or FlashROM, but may also be a volatile memory such as a random access memory (RAM). This memory 70 may be used to store user data, operating data or operating algorithms.

The controller 62 will execute some form of communication algorithm, and in the context of the invention, also have the functionality to perform the following tasks: receiving request packets; extracting location information from received packets; generating acknowledgement packets and inserting location information into such acknowledgement packets; and returning acknowledgement packets to the data service provider infrastructure 14, via a carrier network 12A, 12B, 12C. This functionality could easily be added to existing mobile devices 10, with simple alterations to their existing software code.

The implementation of the invention provides many advantages to the operators of the various networks. For example, it allows the carrier network 12A, 12B, 12C to: determine how heavy the loading is on its resources, and what the traffic patterns are; identify heavy load areas, which allows it to concentrate its upgrade efforts in areas that will provide the best return on investment; detect performance problems, for example, if a certain base station can be found to be operating at less than expected capacity (or not at all); and the invention can be implemented without carriers having to change any hardware or software on their systems.

The invention also provides many benefits to the digital service provider 14, for example: it can determine whether a service problem lies with the data service provider infrastructure 14 or with a carrier's network 12A, 12B, 12C, so end user complaints can be directed to the particular party responsible for the problem. This reduces help desk costs and increases user satisfaction; it can determine how quickly messages are circulating through the network. This may assist in determining whether a carrier 12A, 12B, 12C is handling messages as quickly as it is supposed to. The data is collected by time stamping "request" packets as they depart from the digital service provider infrastructure 14, and comparing that with the time at which a corresponding "acknowledgement" packet is returned; and it gives the digital service provider 14 an additional service which can be offered to the carriers 12A, 12B, 12C. This might become a market differentiator between different digital service providers. Also, because of where the new functionality is located (at the mobile devices 10 and at the data service provider infrastructure 14), it is easy to upgrade software as required. Additional advantages of the invention are described hereinafter with respect to the preferred embodiments of the invention.

Preferred Embodiments of the Invention

One of the parameters that drives the preferred embodiment of the invention is that of privacy. Regulations regarding the privacy of end users vary from one legal jurisdiction to another, and in fact, desired privacy levels may vary from one customer to another (some companies, for example, may demand higher levels of security than the levels required by law). Accordingly, it is generally necessary to implement the invention with the following limitation: requiring that location information and end user's equipment identifiers never be stored together in a permanent database. However, this restriction means that mobile devices cannot be tracked as they move, and as a result one cannot maintain mobile device population and density statistics for network base stations.

There are also a number of other restrictions that it is desirable to satisfy. For example: it is preferable that mobile devices and servers implementing the invention be backwards compatible with earlier versions of these components. This is desirable from a business standpoint as it would allow the same infrastructure to support both versions of the equipment; power consumption of mobile devices is very important. Thus, it is preferable to minimize the number of additional data transmissions that will have to be performed, and to minimize the number of additional bits required in those transmissions.

Figure 1:
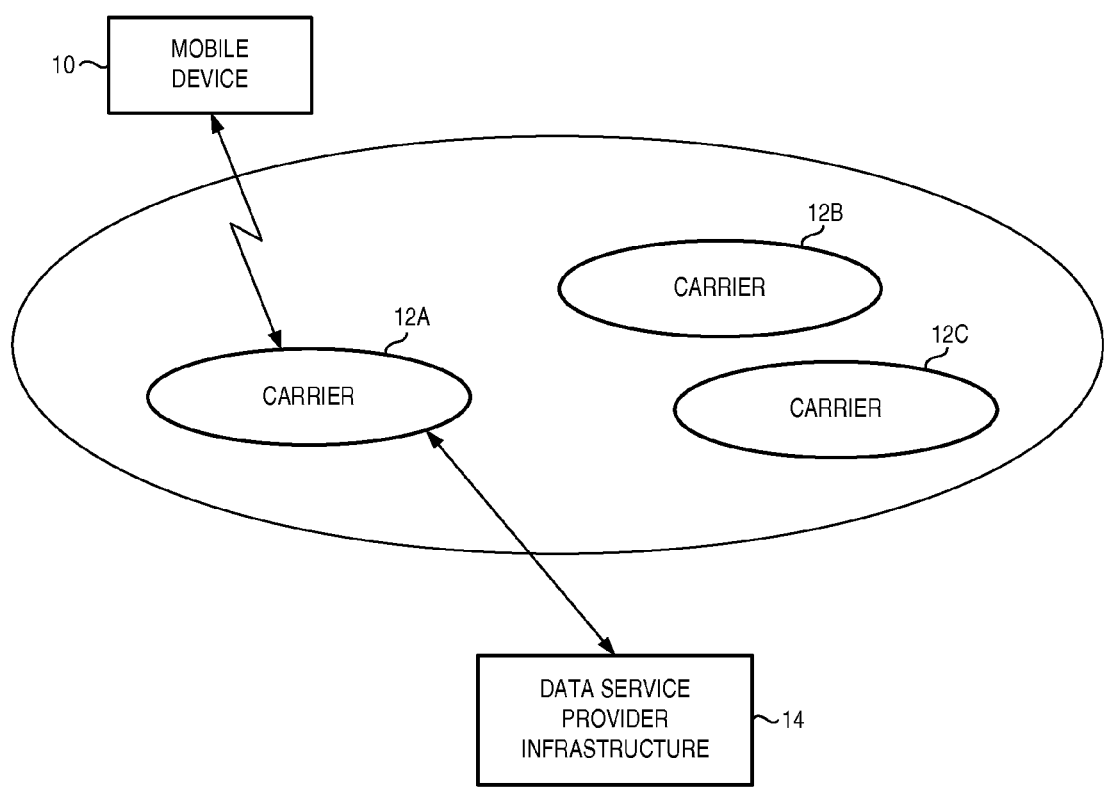
FIG. 1 presents a block diagram of an exemplary network architecture to which the invention may be applied.
Figure 5:
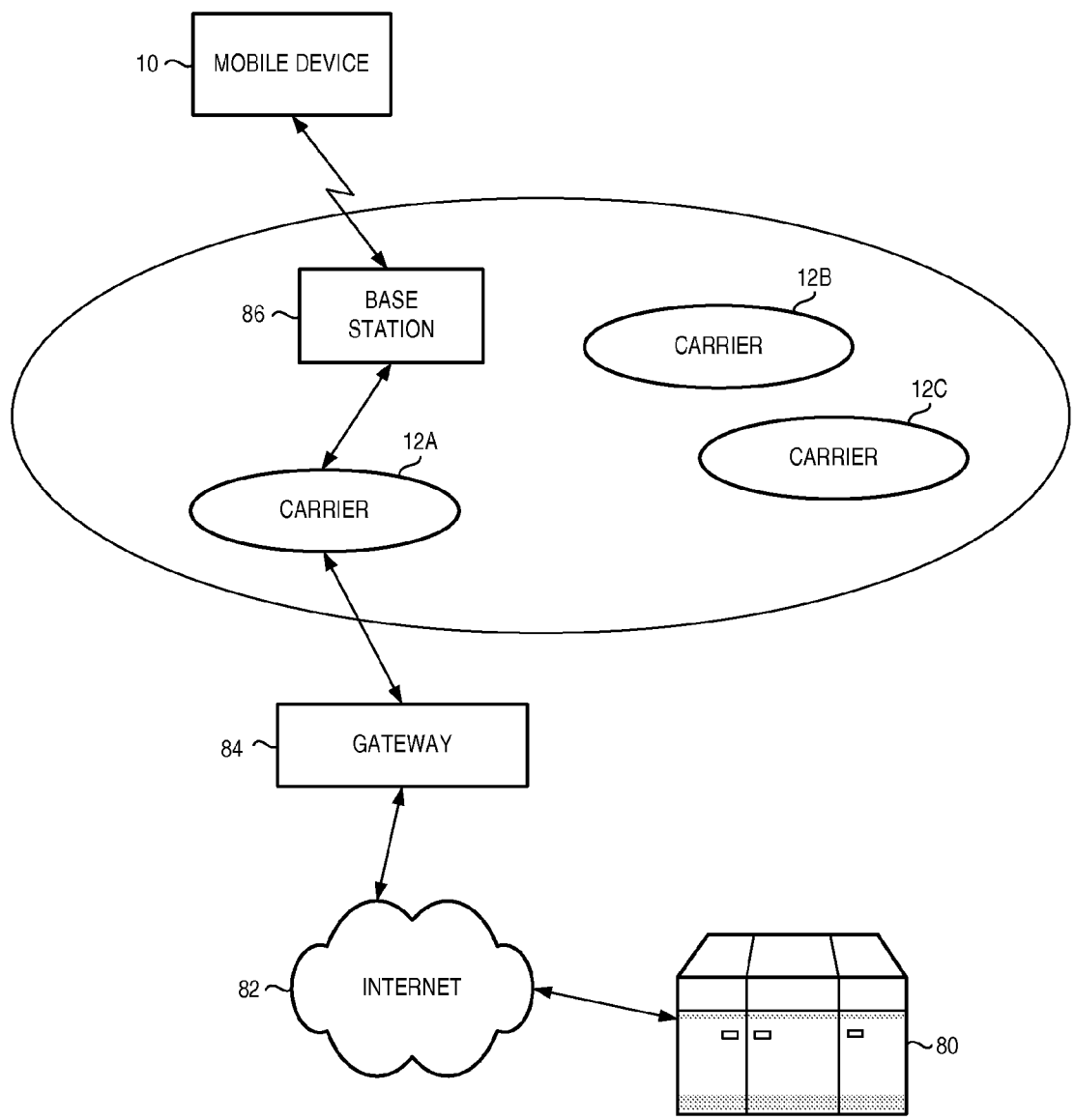
FIG. 5 presents a block diagram of an exemplary network architecture, in an embodiment of the invention.

The system architecture of the preferred embodiment is much like that of FIG. 1, except that as shown in FIG. 5, the data service provider infrastructure 14 preferably consists of a server 80 connected to various carrier networks 12A, 12B, 12C via an Internet network 82 and a gateway 84. This allows a single server 80 (or cluster of servers) to manage many end users and carrier networks 12A, 12B, 12C over a broad geographic area. The architecture of FIG. 5 also explicitly shows a base station 86 that provides the wireless link to the mobile device 10.

Figure 6:
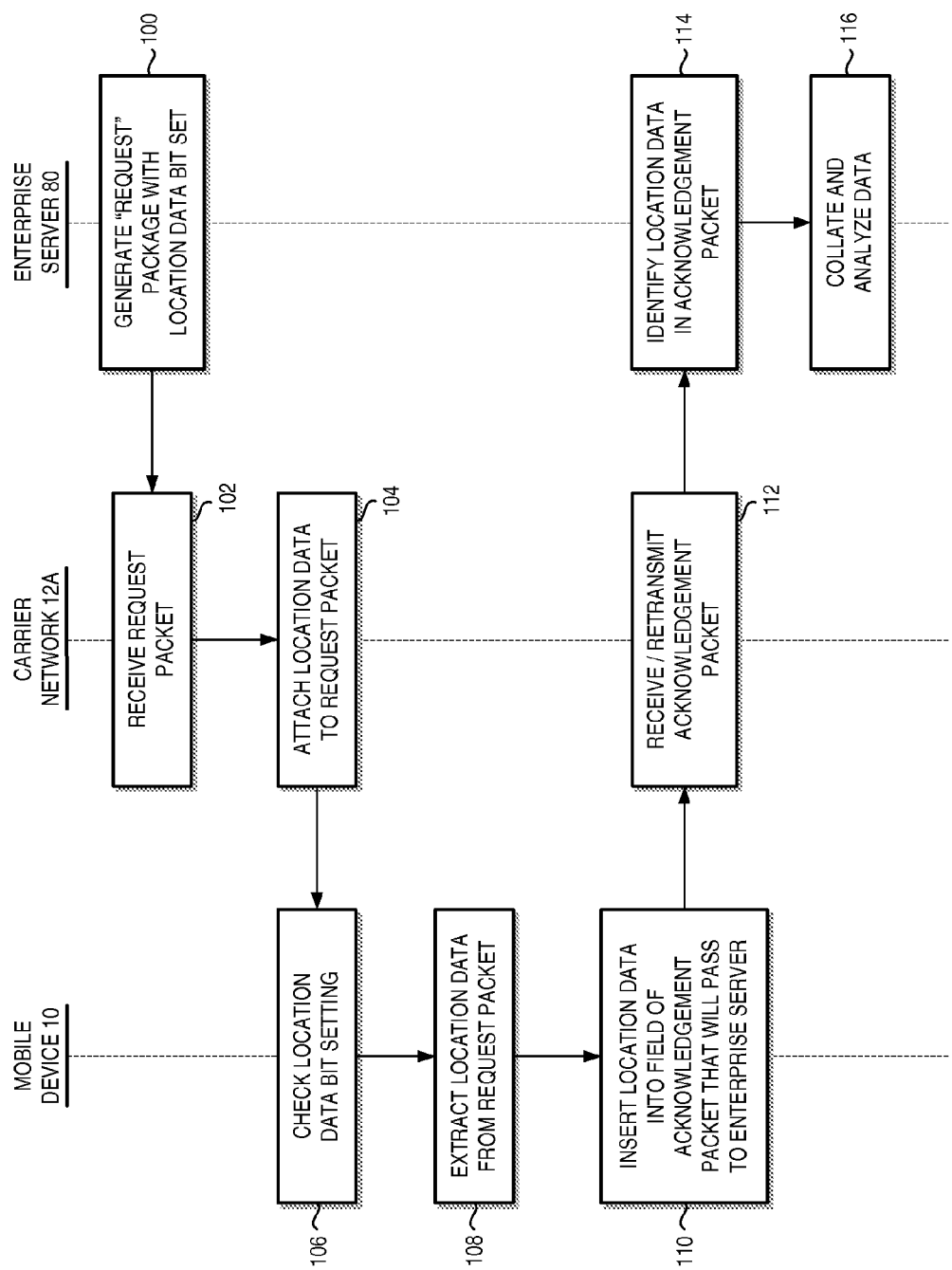
FIG. 6 presents a flow diagram of a method of monitoring network health, in an embodiment of the invention.

The message flow diagram of FIG. 6 presents the preferred method of the invention. In fact, FIG. 6 presents only part of a regular communication, focusing on the communications that deal with the transfer of location data specifically.

To begin with, a communication link is established between the server 80 and the mobile device 10, via the intermediate components (specifically, the Internet network 82, gateway 84, carrier network 12A and base station 86). The manner in which this communication is established is well known in the art, and will vary with the particular communication system and protocol being employed.

At some point after this communication link has been established, the algorithm on the server 80 will decide that location information is needed, and a control or data packet will issue, including a request for location information. This packet will be transmitted to the mobile device 10 at step 100. In the preferred embodiment of the invention any control or data packet may be used, with a single bit set as a flag, which indicates to the mobile device 10 that location information is desired.

In the preferred embodiment, the request packet that is being sent, is a packet that would be sent in the usual course of communication between the enterprise server 50 and the mobile device 10. Thus, the implementation of the invention does not increase the number of messages being sent between the enterprise server 50 and the mobile device 10. As well, by using only a single bit as the flag to indicate that location information is desired, there is only a very small increase in the amount of bandwidth and power needed to transmit this packet.

The bit that is set is not used in regular communications, thus the implementation of the invention is backwards compatible to mobile devices that are not equipped to handle the invention. Older versions of mobile devices will simply ignore the setting of this unused bit.

This request packet is then routed through the rest of the data service provider's infrastructure (Internet network 82 and gateway 84), in the manner know in the art.

The carrier network 12A then receives the request packet at step 102, and attaches location data to it at step 104, passing it on to the mobile device 10. As noted above, this location data is used by the carrier network 12A and mobile device 10 for book keeping purposes.

Ultimately, this request packet is received by the mobile device 10, and is examined at step 106 for the presence of the bit which indicates that location data is required. As noted above, mobile devices that are not compatible with the invention, will ignore the setting of this bit as it is unused. Such non-compatible mobile devices will then prepare a standard acknowledgement packet, and return that packet to the server 80. This allows the invention to be backward compatible with older systems.

Mobile devices 10 that are compatible with the invention will also prepare an acknowledgement packet in response, but will extract the location data from the received request packet at step 108, store it locally, and then insert it into the acknowledgement packet at step 110. As in the case of the request packet above, no additional packets have been added to the standard communication flow, minimizing the impact of the invention on power consumption and bandwidth.

The location data that is inserted into the acknowledgement packet will vary with the application, but may include one or more of the following parameters. Note that this location information is formatted in the acknowledgement packet as a sequence of tag/length/value. In the value field, the data related to the value on the tag field is entered, while the length filed is used for entering the length of the data. The tags may be defined as follows:

Tag=1 (NPC—1, 4 or 8 bytes)
Tag=2 (Country code), a standard telecommunications code that identifies the country is which the mobile device 10 is being used;
Tag=3 (Network code);
Tag=4 (Location area);
Tag=5 (Routing area);
Tag=6 (Base);
Tag=7 (Area);
Tag=8 (Channel);
Tag=9 (TrafNum);

This location data is simply inserted into a field of the acknowledgement packet that the carrier network 12A will regard as data rather than instructions to it; thus, the carrier network 12A will simply pass this location information back to the server 80 at step 112.

When the server 80 receives the acknowledgement packet at step 114, it determines whether location data has been included, by virtue of whether one or more location data fields have been filled. If so, the location data is stored, collated and/or analyzed at step 116.

This process of sending requests and receiving acknowledgements including location data, can be executed on a continuous basis, so that the system's understanding of network health stays current. That is, the mobile device 10 could return location data in response to any packet received from the server 80.

As noted above, many traffic management and network analysis techniques are known in the art. These would include the following: determining average and peak packet delivery times and related those times to particular base stations or carrier networks; determining base station traffic patterns such as packet delivery rates, packets/minute/base, and delivery round-trip/base; predicting traffic problems due to statistical increases in demands on certain network nodes; and determining the number of mobile devices connected to a particular carrier or base station with respect to time of day.

Other Privacy Issues

As noted above, regulatory requirements regarding the privacy of end users may vary from one legal jurisdiction to another, and may even vary from one customer to another. In general, however, they do not allow location information and the end user's equipment identifiers to be stored together in a permanent database.

As well, it may be desirable to implement the invention with the following functionality, in the interest of privacy: mobile devices may implement an option whereby the end user can disable the reporting of location information. This is easily done by having mobile devices ignore the request for information; IT Policy may be extended to allow an IT department to disable the reporting of location information for any of its end users; and licensing agreements may be amended to include a paragraph informing the customer that the data service provider may collect mobile device location. All of these options are easily implemented in view of the description of the invention above.

Other Considerations

The details of how the invention could be applied to different environments will vary. However, a number of other important considerations include the following:

1. Device Presence Reports: While avoiding privacy information, it still may be desirable to monitor the approximate number of mobile devices and their ability to communicate with the network. If ping packets (for example, the GCMP ping sent in the case of GPRS and CDMA, every 15 minutes), were replaced with packets that include location information, then one could maintain a count of device reports per minute per base. Note that ping packets are not generally sent if there is regular communication with a mobile device, so replacing ping packets with a location report does not guarantee that all mobile devices will always send the reports. However, when the location reports are combined with delivery acknowledgements containing location information, there will be sufficient information to determine network performance trends, and to make a better determination of base station health;

2. Use of Send-only Devices: If a device only sends messages, and never receives messages, then it will never send location information. If too many such devices are present then the statistical information gathered through the location reports will be inaccurate. It is assumed, though, that the percentage of devices which only send messages will be very small, and thus have little impact; and 3. Opt-out Devices: Since it is desirable to provide methods which allow mobile devices to opt out of reporting their locations, the statistical information will be inaccurate according to the percentage of devices which opt out of these reports.

CONCLUSIONS

Numerous modifications, validations and adaptations may be made to the particular embodiments of the invention described herein, without departing from the scope of the invention, which is defined in the claims.

While particular embodiments of the present invention have been shown and described, it is clear that changes and modifications may be made to such embodiments without departing from the true scope and spirit of the invention. For example, the invention could be applied to digital or analogue communications, or voice or data, using wireless, fiber optic or hardwired technologies.

The method steps of the invention may be embodiment in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory medium such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

We claim:

1. An apparatus for facilitating monitoring of the health of a telecommunication network, said apparatus comprising:
    a request generator configured to generate a data packet request for mobile-device location information;
    an identifier configured to identify location data contained in a mobile-device response to a modified data packet request, the location data comprising information extracted from a header of said modified data packet request and inserted into a data field of an acknowledgement packet of the mobile-device response; and
    an analyzer configured to analyze the location data identified by said identifier, analysis of the location data providing indication of the health of the telecommunication network.

2. The apparatus of claim 1 further comprising a data service provider infrastructure device connected to, and separate from, the telecommunications network.

3. The apparatus of claim 1 wherein the data packet request generated by said request generator comprises a flag of a packet message.

4. The apparatus of claim 3 wherein said request generator is configured to use a single bit as the flag.

5. The apparatus of claim 1 wherein said identifier is further configured to determine whether the mobile-device response includes the location data.

6. The method for facilitating monitoring of the health of a telecommunication network, said method comprising:
    generating a data packet request for mobile-device location information;
    identifying location data contained in a mobile-device response to a modified data packet request, the location data comprising information extracted from a header of said modified data packet request and inserted into a data field of an acknowledgement packet of the mobile-device response; and analyzing the location data identified during said identifying, analysis of the location data providing indication of the health of the telecommunication network.

7. The method of claim 6 wherein said generating, said identifying, and said analyzing are performed at a data service provider infrastructure device connected to, and separate from, the telecommunications network.

8. The method of claim 6 wherein said generating the data packet request comprises generating a flag in a message of said data packet.

9. The method of claim 8 wherein the flag comprises a single bit.

10. The method of claim 8 wherein the flag comprises a single bit of the packet message.

11. The apparatus of claim 6 wherein said identifying further identifies whether the mobile-device response includes the location data.

12. An apparatus embodied at a mobile device for facilitating monitoring of the health of a telecommunication network, said apparatus comprising:

an examiner configured to examine a received data packet at the mobile device to determine whether the received data packet includes a request for location information of the mobile device;

an extractor configured to extract location data from a header part of the received data packet if said examiner determines that the received data packet includes the request for the location information; and an inserter configured to insert the location data into a data field of an acknowledgement packet of a mobile device response to the received data packet.

13. The apparatus of claim 12 wherein said examiner is configured to examiner a flag of the received data packet to determine whether the received data packet includes the request for the location information.

14. The apparatus of claim 12 wherein the location data extracted by said extractor comprises network-added location data.

15. A method at a mobile device for facilitating monitoring of the health of a telecommunication network, said method comprising:

examining a received data packet at the mobile device to determine whether the received data packet includes a request for location information of the mobile device;

extracting location data from a header part of the received data packet if determination is made during said examining that the received data packet includes the request for the location information; and inserting the extracted location data into a data field of an acknowledgement packet of a mobile device response to the received data packet.

16. The method of claim 15 wherein said examining comprises examining a single-bit flag of the received data packet to determine whether the received data packet includes the request for location information.

17. The method of claim 15 wherein said extracting location data comprises extracting network-added location data from the header of the received data packet.

18. The apparatus of claim 1 wherein said modified data packet request further comprises a modification of a header of said data packet request to include network-added location data in said header of said modified data packet request.

19. The method of claim 6 wherein said identifying location data further comprises identifying a modification of a header of said data packet request that includes network-added location data in said header of said modified data packet request.

* * * * *